US011535295B2

(12) United States Patent
Ide

(10) Patent No.: US 11,535,295 B2
(45) Date of Patent: *Dec. 27, 2022

(54) DRIVING SUPPORT APPARATUS

(71) Applicant: TOYOTA JIDOSHA KABUSHIKI KAISHA, Toyota (JP)

(72) Inventor: Hirohito Ide, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 48 days.

This patent is subject to a terminal disclaimer.

(21) Appl. No.: 16/908,879

(22) Filed: Jun. 23, 2020

(65) Prior Publication Data

US 2020/0317265 A1    Oct. 8, 2020

Related U.S. Application Data

(63) Continuation of application No. 16/144,560, filed on Sep. 27, 2018, now Pat. No. 10,759,477.

(30) Foreign Application Priority Data

Sep. 28, 2017    (JP) ................ 2017-187662

(51) Int. Cl.
*B60W 30/10* (2006.01)
*B60W 60/00* (2020.01)
(Continued)

(52) U.S. Cl.
CPC .......... *B62D 15/025* (2013.01); *B60W 10/18* (2013.01); *B60W 10/20* (2013.01); *B60W 20/15* (2016.01);
(Continued)

(58) Field of Classification Search
CPC .... B60W 30/10; B60W 30/16; B60W 30/165; B60W 50/10; B60W 60/0053;
(Continued)

(56) References Cited

U.S. PATENT DOCUMENTS 5,572,449 A * 11/1996 Tang .......................... B60T 7/22
700/304
6,289,273 B1    9/2001 Boettiger et al.
(Continued)

FOREIGN PATENT DOCUMENTS

DE    102006043150 A1 *  3/2008 ............ B60W 30/08
JP    2000-198458 A    7/2000
(Continued)

OTHER PUBLICATIONS

EPO machine translation of JP 2004-206275 (original JP document published Jul. 22, 2004) (Year: 2004).
(Continued)

*Primary Examiner* — David A Testardi
(74) *Attorney, Agent, or Firm* — Sughrue Mion, PLLC

(57) ABSTRACT

A non-transitory computer-readable medium storing instructions, the instructions, when executed by a processor, cause the processor to: perform a follow-up steering control for changing a steering angle of a vehicle in such a manner that the vehicle travels along a target traveling line determined based on a preceding vehicle trajectory, which is a travel trajectory of a preceding vehicle traveling ahead of the vehicle; and when a first distance condition and a manual steering condition are both satisfied while the follow-up steering control is being performed, stop the follow-up steering control, the first distance condition being a condition satisfied when a deviation distance in a road-width direction between the preceding vehicle trajectory and the vehicle is equal to or longer than a predetermined first threshold, and the manual steering condition being a condition satisfied when a driver operates a steering wheel to change a position in the road-width direction.

5 Claims, 9 Drawing Sheets

(51) Int. Cl.
*B62D 15/02* (2006.01)
*B60W 30/00* (2006.01)
*G05D 1/00* (2006.01)
*B60W 20/15* (2016.01)
*B60W 10/18* (2012.01)
*B60W 10/20* (2006.01)
*B60W 30/12* (2020.01)
*B60W 30/16* (2020.01)
*B60W 30/18* (2012.01)
*B62D 5/04* (2006.01)

(52) U.S. Cl.
CPC ............ *B60W 30/00* (2013.01); *B60W 30/10* (2013.01); *B60W 30/12* (2013.01); *B60W 30/16* (2013.01); *B60W 30/18109* (2013.01); *B60W 60/0053* (2020.02); *B62D 5/0406* (2013.01); *B62D 15/026* (2013.01); *G05D 1/0061* (2013.01); *B60T 2201/081* (2013.01); *B60T 2201/087* (2013.01); *B60W 2554/4041* (2020.02)

(58) Field of Classification Search
CPC ............ B60W 60/0055; B62D 15/025; B62D 15/026; G05D 1/0061; G05D 1/0295; G08G 1/16; G08G 1/22; B60K 2310/266
See application file for complete search history.

(56) References Cited

U.S. PATENT DOCUMENTS

| | | |
|---|---|---|
| 2001/0014846 A1 | 8/2001 | Sawamoto et al. |
| 2002/0169531 A1 | 11/2002 | Kawazoe et al. |
| 2005/0270145 A1 | 12/2005 | Kataoka et al. |
| 2006/0025918 A1 | 2/2006 | Saeki |
| 2007/0106475 A1 | 5/2007 | Kondoh |
| 2008/0249688 A1 | 10/2008 | Sawamoto |
| 2009/0299573 A1* | 12/2009 | Thrun .................. B62D 15/025 701/41 |
| 2010/0299043 A1 | 11/2010 | Dorenkamp et al. |
| 2010/0324797 A1 | 12/2010 | Fritz |
| 2013/0231829 A1 | 9/2013 | Gerdt |
| 2013/0297172 A1 | 11/2013 | Ariga et al. |
| 2014/0019031 A1* | 1/2014 | Solyom .................... G08G 1/22 701/117 |
| 2014/0180569 A1* | 6/2014 | Ueda .................... B62D 15/025 701/400 |
| 2015/0127189 A1* | 5/2015 | Mehr ....................... G08G 1/22 701/1 |
| 2016/0052547 A1* | 2/2016 | Kashiwai ............ B60W 40/076 701/41 |
| 2016/0200321 A1* | 7/2016 | Yamada .................. G05D 1/021 701/96 |
| 2016/0257342 A1 | 9/2016 | Ueda et al. |
| 2017/0068248 A1* | 3/2017 | Kobayashi ........... G05D 1/0246 |
| 2017/0158238 A1 | 6/2017 | Takaso |
| 2017/0197620 A1 | 7/2017 | Igarashi |
| 2017/0203788 A1 | 7/2017 | Heo |
| 2017/0225686 A1* | 8/2017 | Takaso ................. G05D 1/0219 |
| 2017/0267237 A1 | 9/2017 | Oyama |
| 2017/0326980 A1 | 11/2017 | Masui et al. |
| 2018/0025646 A1* | 1/2018 | Jeon ...................... G05D 1/0061 701/41 |
| 2018/0043890 A1* | 2/2018 | Keller ............... B60W 30/0956 |
| 2018/0257648 A1* | 9/2018 | Katoh .................. G05D 1/0251 |
| 2019/0092390 A1 | 3/2019 | Ide |
| 2020/0010085 A1* | 1/2020 | Ohmura ............. B60W 60/0011 |

FOREIGN PATENT DOCUMENTS

| | | | |
|---|---|---|---|
| JP | 2004-206275 A | 7/2004 | |
| JP | 2006315491 A | 11/2006 | |
| JP | 2007-062711 A | 3/2007 | |
| JP | 2007062711 A * | 3/2007 | ............ B60W 30/08 |
| JP | 2008195402 A | 8/2008 | |
| JP | 4172434 B2 | 10/2008 | |
| JP | 2009-001107 A | 1/2009 | |
| JP | 2009-166537 A | 7/2009 | |
| JP | 2009190464 A | 8/2009 | |
| JP | 4349210 B2 | 10/2009 | |
| JP | 2010006279 A | 1/2010 | |
| JP | 2011514580 A | 5/2011 | |
| JP | 4929777 B2 | 5/2012 | |
| JP | 2014-046748 A | 3/2014 | |
| JP | 2014148293 A | 8/2014 | |
| JP | 2016101783 A | 6/2016 | |
| JP | 2017-076234 A | 4/2017 | |
| JP | 2017144817 A * | 8/2017 | |
| WO | 2017064981 A1 | 4/2017 | |

OTHER PUBLICATIONS

EPO machine translation of JP 2007-62711 (original JP document published Mar. 15, 2007) (Year: 2007).

\* cited by examiner $$L1: f(x) = ax^3 + bx^2 + cx + d$$

$$\text{RADIUS OF CURVATURE } R(x) = \frac{(1 + 3ax^2 + 2bx + c)^{1.5}}{6ax + 2b}$$

$$\text{CURVATURE } Cv(x) = \frac{6ax + 2b}{(1 + 3ax^2 + 2bx + c)^{1.5}}$$

$$1 \gg 3ax^2 + 2bx + c$$

$$\tan \theta v \fallingdotseq \theta v$$

$Cv(x) = 6ax + 2b$
$Cv(0)(=Cv) = 2b$
$C(x')(=Cv') = 6a$
$\theta v = c$
$dv = d$

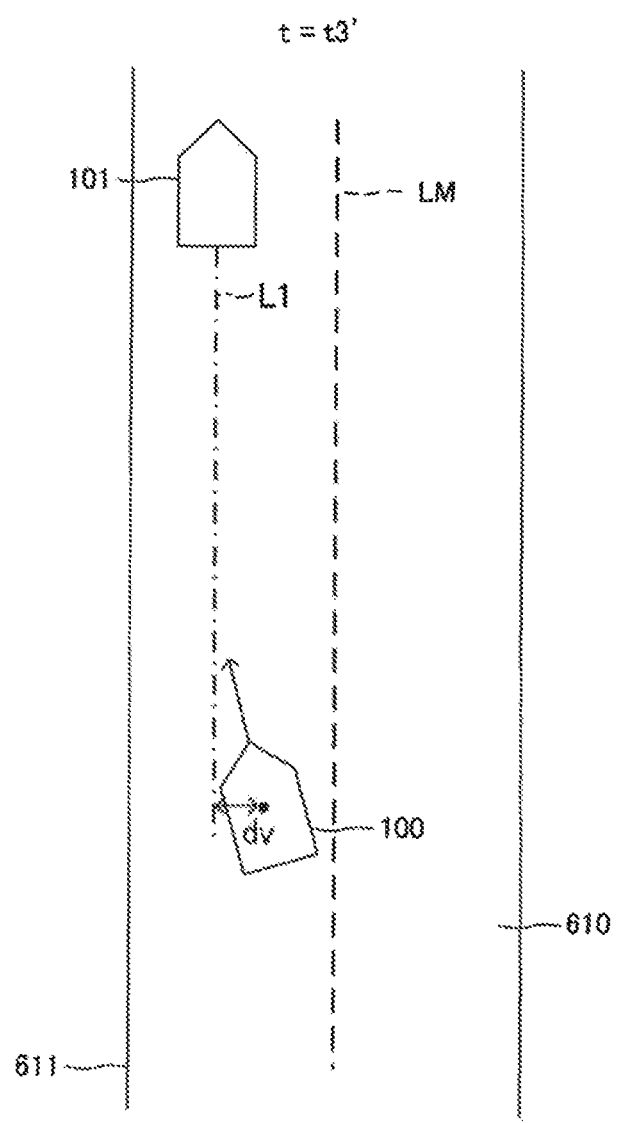

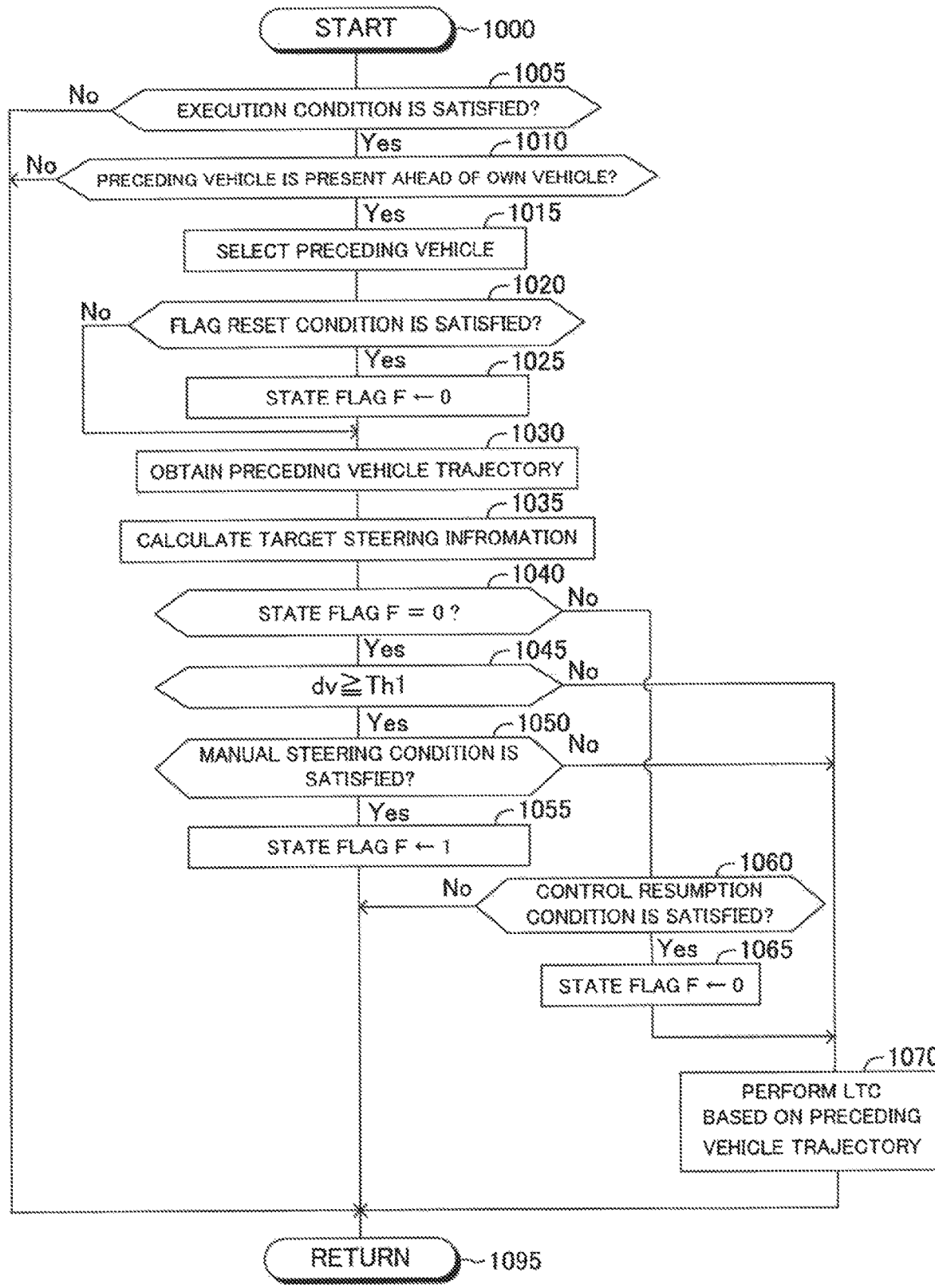

DRIVING SUPPORT APPARATUS

CROSS-REFERENCE TO RELATED APPLICATIONS

This application is a Continuation of U.S. patent application Ser. No. 16/144,560, filed Sep. 27, 2018, which claims priority to Japanese Patent Application No. 2017-187662 filed on Sep. 28, 2017, the disclosures of which are incorporated herein in their entirety by reference.

BACKGROUND

1. Technical Field

The present disclosure relates to a driving support apparatus configured to perform a follow-up steering control for changing a steering angle of a vehicle (own vehicle) in such a manner that the vehicle travels along a target traveling line set based on a travel trajectory of a preceding vehicle.

2. Description of the Related Art

One of driving support apparatuses which are conventionally known is configured to perform a control for adjusting an acceleration (including a deceleration) of an own vehicle in such a manner that a distance between the own vehicle and another vehicle (preceding vehicle) traveling in a front area of the own vehicle is maintained at a predetermined target inter-vehicle distance (for example, see Japanese Patent Application Laid-Open (kokai) 2016-101783 A). The above-mentioned control is also referred to as a "following-travel inter-vehicle-distance control" or "inter-vehicle-distance control".

Another driving support apparatus (hereinafter, referred to as a "related-art apparatus") specifies a preceding vehicle traveling ahead of the own vehicle while the following-travel inter-vehicle-distance control is being performed. Further, the related-art apparatus performs a steering control in such a manner that the own vehicle travels along a travel trajectory/locus of the specified preceding vehicle (for example, see Japanese Unexamined Patent Application Publication (Translation of PCT Application) No. 2011-514580). The above-mentioned control is also referred to as a "follow-up steering control" or "preceding-vehicle-following steering control". Hereinafter, the travel trajectory/locus of the preceding vehicle will be referred to as a "preceding vehicle trajectory".

However, when performing the follow-up steering control by utilizing the preceding vehicle trajectory, the following problem may occur. For example, the preceding vehicle may sometimes travel at a position away from a center line of a road (travel lane). In an example of FIG. 6, a preceding vehicle 101 travels in a vicinity of a left edge 611 of a travel lane 610. In this case, the related-art apparatus performs the follow-up steering control for the own vehicle 100 in such a manner that the own vehicle 100 follow a preceding vehicle trajectory L1 of the preceding vehicle 101. Therefore, the own vehicle 100 travels in the vicinity of the left edge 611 of the travel lane 610.

In such a situation, the driver may wish to modify the position of the own vehicle 100 to a position (100*) near a center line LM of the travel lane 610, and therefore, the driver may manually perform a steering operation (that is, manually operates a steering wheel). By this steering operation, as illustrated by the arrow A in FIG. 6, the position of the own vehicle 100 is moved in the road-width direction.

However, as the driver stops the manual steering operation, the related-art apparatus performs the follow-up steering control based on the preceding vehicle trajectory to thereby return the own vehicle 100 to a position near the left edge 611 of the travel lane 610 as illustrated by the arrow B. That is, under performance of the follow-up steering control, even if the driver intentionally performs the steering operation to modify the position of the own vehicle 100, the modified position of the own vehicle 100 cannot be maintained. Therefore, there is a problem that the driver feels discomfort.

SUMMARY

One or more embodiments have been devised in view of the above-mentioned problem. Specifically, there is provided a driving support apparatus configured to, when the driver performs the steering operation while the follow-up steering control is being performed, maintain the position in the road-width direction of the own vehicle after that steering operation.

According to one embodiment, there is provided a driving support apparatus for a vehicle, including:

a steering operation unit (SW) configured to be operated by a driver of the vehicle;

a steering device (40, 41, 42) configured to change a steering angle of the vehicle in response to an operation amount of the steering operation unit;

a travel trajectory obtaining unit (10, 10*b*) configured to obtain a preceding vehicle trajectory which is a travel trajectory of a preceding vehicle traveling ahead of the vehicle; and a control unit (10, 10*c*) configured to perform a follow-up steering control for changing the steering angle of the vehicle in such a manner that the vehicle travels along a target traveling line determined based on the preceding vehicle trajectory.

Further, the control unit is configured to, when a first distance condition and a manual steering condition are both satisfied while the follow-up steering control is being performed, stop the follow-up steering control (Step 1045: Yes, Step 1050: Yes, and Step 1055). The first distance condition is a condition satisfied when a deviation distance (dv) in a road-width direction between the preceding vehicle trajectory and the vehicle is equal to or longer than a predetermined first threshold (Th1). The manual steering condition is a condition satisfied when the driver operates the steering operation unit to change a position in the road-width direction of the vehicle.

The driving support apparatus stops the follow-up steering control, when the driver intentionally and manually performs the steering operation to modify/change the position in the road-width direction of the own vehicle while the follow-up steering control is being performed in accordance with the target traveling line determined based on the preceding vehicle trajectory. Therefore, the position of the own vehicle 100 is not returned to the position before that modification by the follow-up steering control based on the preceding vehicle trajectory. In other words, the driving support apparatus can maintain the position of the own vehicle which has been modified/changed through the steering operation of the driver during performance of the follow-up steering control.

In an aspect of the driving support apparatus, the control unit is configured to, when a second distance condition is satisfied in a state in which the follow-up steering control is stopped owing to the satisfaction of both the first distance condition and the manual steering condition, resume the follow-up steering control (Step 1040: No, Step 1060: Yes, Step 1065 and Step 1070). The second distance condition is a condition satisfied when the deviation distance is equal to or shorter than a predetermined second threshold.

According to the above aspect, in the state in which the follow-up steering control based on the preceding vehicle trajectory is stopped, the follow-up steering control is resumed in response to the positional relationship between the vehicle and the preceding vehicle trajectory. For example, when the preceding vehicle moves in such a manner that the distance between the preceding vehicle trajectory and the vehicle becomes shorter, or the driver intentionally performs the steering operation to bring the position of the own vehicle to a position close to the preceding vehicle trajectory, the driving support apparatus according to the present aspect can resume the follow-up steering control based on the preceding vehicle trajectory.

An aspect of the driving support apparatus further includes a detector (13, 14) configured to detect a steering-related amount (θ, Tra) which is an amount concerning an operation state of the steering operation unit. Further, the control unit is configured to determine whether or not the manual steering condition is satisfied based on the detected steering-related amount.

The driving support apparatus according to the above aspect can determine whether or not the driver performs the steering operation based on the steering-related amount detected by the detector.

In the above description, in order to facilitate understanding of the above one or more aspect of the embodiment, a name and/or reference numeral used in embodiments described below is enclosed in parentheses and assigned to each of the constituent features corresponding to the embodiments. However, each of the constituent features is not limited to the embodiments defined by the name and/or reference numeral.

BRIEF DESCRIPTION OF THE DRAWINGS

FIG. 3A is a plan view for explaining the lane keeping assist control of FIG. 2 in more detail.

FIG. 3B shows expressions for explaining a relationship between coefficients of a cubic function of the preceding vehicle trajectory, a curvature of the cubic function, a radius of curvature of the cubic function, and the like.

FIG. 3C shows expressions for explaining a relationship between the coefficients of the cubic function of the preceding vehicle trajectory, the curvature of the cubic function, a yaw angle, and the like.

FIG. 9 is a plan view for illustrating a situation in which the own vehicle is brought close to the left edge of the travel lane after the situation of FIG. 7.

FIG. 10 is a flowchart for illustrating one routine of the lane keeping assist control (LTC) executed by a driving support ECU according to the embodiment.

DETAILED DESCRIPTION OF THE EMBODIMENTS

Now, referring to the accompanying drawings, a description is given of embodiment(s). The accompanying drawings are illustrations of one or more specific embodiments in conformity with the principle thereof, but those illustrations are examples to be used for the understanding of the embodiment(s), and are not to be used to limit the interpretation of the present disclosure.

<Configuration>

Figure 1:
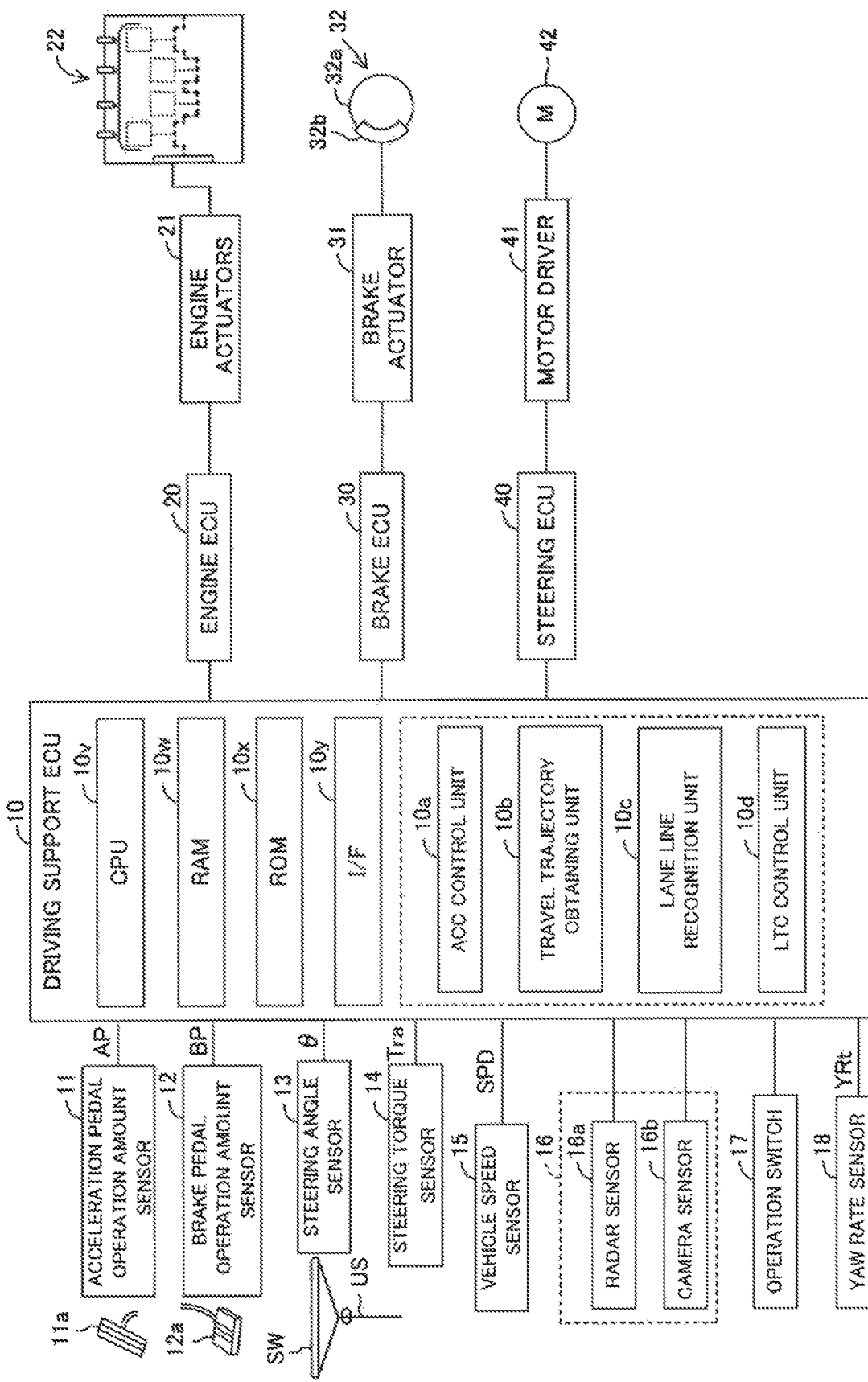
FIG. 1 is a schematic configuration diagram for illustrating a driving support apparatus for a vehicle according to an embodiment.

A driving support apparatus (hereinafter, referred to as an "embodiment apparatus") according to an embodiment of the present disclosure is applied to a vehicle. As illustrated in FIG. 1, the embodiment apparatus includes a driving support (assist) ECU 10, an engine ECU 20, a brake ECU 30, and a steering ECU 40.

Those ECUs are electric control units each including a microcomputer as a main part, and are connected to one another so as to be able to mutually transmit and receive information via a controller area network (CAN) (not shown). The microcomputer herein includes a CPU, a RAM, a ROM, an interface I/F, and the like. For example, the driving support ECU 10 includes a microcomputer including a CPU 10v, a RAM 10w, a ROM 10x, an interface (I/F) 10y, and the like. The CPU 10v executes instructions (programs and routines) stored in the ROM 10x to realize various functions.

The driving support ECU 10 is electrically connected to sensors including switches described later and receives detection signals or output signals of the sensors, respectively. The sensors may be electrically connected to any of the ECUs other than the driving support ECU 10. In this case, the driving support ECU 10 receives the detection signals or the output signals of the sensors from the ECUs electrically connected to the sensors via the CAN.

An acceleration pedal operation amount sensor 11 detects an operation amount (accelerator opening) AP of an acceleration pedal 11a of the own vehicle and outputs a detection signal or an output signal indicative of the operation amount AP to the driving support ECU 10. A brake pedal operation amount sensor 12 detects an operation amount BP of a brake pedal 12a of the own vehicle and outputs a detection signal or an output signal indicative of the operation amount BP to the driving support ECU 10.

A steering wheel SW is a steering operation unit which is operated by the driver for changing a steering angle of the own vehicle. The driver can change the steering angle of the own vehicle in response to an operation amount of the steering wheel SW.

A steering angle sensor 13 detects a steering angle θ of the own vehicle and outputs a detection signal or an output signal indicative of the steering angle θ to the driving support ECU 10. The value of the steering angle θ becomes a positive value when the steering wheel SW is rotated from a predetermined reference position in a first direction. The value of the steering angle θ becomes a negative value when the steering wheel SW is rotated from the predetermined reference position in a second direction opposite to the first direction.

A steering torque sensor 14 detects a steering torque Tra applied to a steering shaft US of the own vehicle by an operation of a steering wheel SW and outputs a detection signal or an output signal indicative of the steering torque Tra to the driving support ECU 10. The value of the steering torque Tra becomes a positive value when the steering wheel SW is rotated in the first direction. The value of the steering angle θ becomes a negative value when the steering wheel SW is rotated in the second direction.

In addition, the steering angle θ and the steering torque Tra are also referred to as a "steering-related amount" for convenience.

A vehicle speed sensor 15 detects a traveling speed SPD of the own vehicle and outputs a detection signal or an output signal indicative of the traveling speed SPD to the driving support ECU 10.

An ambient sensor 16 acquires at least information on a road ahead of the own vehicle and information on three-dimensional objects being present on the road. The three-dimensional objects include, for example, moving objects such as pedestrians, bicycles, vehicles and the like, and motionless objects such as power poles, trees, guardrails and the like. Hereinafter, the three-dimensional object will be referred to as a "target object". The ambient sensor 16 includes a radar sensor 16a and a camera sensor 16b.

The radar sensor 16a transmits radio waves each having a millimeter wave band to an area surrounding the own vehicle including at least an area in front of the own vehicle, and receives radio waves reflected by the target object(s) being present within a radiation range. Hereinafter, the radio wave having the millimeter wave band will be referred to as a "millimeter wave" and the radio wave reflected by the target object will be referred to as a "reflected wave". The radar sensor 16a determines the presence or absence of the target object, calculates parameters representing a relative relationship between the own vehicle and the target object, and outputs the determination results and the calculation results to the driving support ECU 10. The parameters representing the relative relationship between the own vehicle and the target object include a position of the target object with respect to the own vehicle, a distance between the own vehicle and the target object, a relative speed of the target object with respect to the own vehicle, and the like.

Specifically, the radar sensor 16a includes a millimeter wave transmitting/receiving part (not shown) and a signal processing part (not shown). The signal processing part acquires, every time a certain period of time elapses, the parameters representing the relative relationship between the own vehicle and the target object based on a phase difference between the millimeter wave transmitted from the millimeter wave transmitting/receiving part and the reflected wave received by the millimeter wave transmitting/receiving part, a damping level of the received reflected wave with respect to the transmitted millimeter wave, a time from the transmission of the millimeter wave to the reception of the reflected wave and the like. The parameters include an inter-vehicle distance (i.e. a longitudinal distance) $Dfx(n)$ of the detected target object (n), a relative vehicle speed $Vfx(n)$ of the target object (n), a lateral distance $Dfy(n)$ of the target object (n), a relative lateral speed $Vfy(n)$ of the target object (n) and the like.

The inter-vehicle distance $Dfx(n)$ is a distance between the own vehicle and the target object (n) (e.g., a preceding vehicle) along a central axis of the own vehicle (central axis extending in the front-rear direction of the own vehicle, that is, the x-axis described later).

The relative vehicle speed $Vfx(n)$ is a difference between a speed Vs of the target object (n) (preceding vehicle) and a speed Vj of the own vehicle (that is, $Vfx(n)=Vs-Vj$). The speed Vs of the target object (n) is a speed of the target object (n) in the traveling direction of the own vehicle (that is, the x-axis described later).

The lateral distance $Dfy(n)$ is a distance in a direction (that is, the y-axis described later) perpendicular to the central axis of the own vehicle between a central position of the target object (n) (e.g., a central position in the vehicle-width direction of the preceding vehicle) and the central axis of the own vehicle. Hereinafter, the lateral distance $Dfy(n)$ will be referred to as a "lateral position".

The relative lateral speed $Vfy(n)$ is a speed of the central position of the target object (n) (e.g., central position in the vehicle-width direction of the preceding vehicle) in the direction (that is, the y-axis described later) perpendicular to the central axis of the own vehicle.

The camera sensor 16b includes a stereo camera (now shown) and an image processing part (not shown). The stereo camera takes a pair of right and left images of landscapes at a right side of the own vehicle ahead of (in front of) the own vehicle and at a left side of the own vehicle ahead of (in front of) the own vehicle. Based on the pair of right and left images, the image processing part determines the presence or absence of the target object, calculates the parameters representing the relative relationship between the own vehicle and the target object, and outputs the determination results and the calculation results to the driving support ECU 10. In this configuration, the driving support ECU 10 obtains/determines/defines the parameters representing the relative relationship between the own vehicle and the target object by synthesizing the following (i) and (ii):

(i) the parameters acquired by the radar sensor 16a, which represent the relative relationship between the own vehicle and the target object, and (ii) the parameters acquired by the camera sensor 16b, which represent the relative relationship between the own vehicle and the target object.

The camera sensor 16b recognizes right and left lane lines of the road (that is, a lane in which the own vehicle is traveling) based on the pair of right and left images. The camera sensor 16b calculates a shape of the road and a positional relationship between the road and the own vehicle (e.g., a distance between the central position in the vehicle-width direction of the own vehicle and a left or right edge of the lane), and outputs the calculation results to the driving support ECU 10. The lane line includes a white line, a yellow line and the like. Hereinafter, an example where the lane line is the white line will be described.

Information on the target object which is acquired by the ambient sensor 16 will be referred to as "target object information". The information includes the parameters representing the relative relationship between the own vehicle and the target object. The ambient sensor 16 repeatedly transmits the target object information to the driving support ECU 10 every time a certain sampling period of time elapses. The ambient sensor 16 does not necessarily include both the radar sensor and the camera, but may include only one of the radar sensor and the camera.

An operation switch 17 is a switch which is operated by a driver of the own vehicle. The driver can control whether or not to perform the following-travel inter-vehicle-distance control such as an adaptive cruise control (ACC) described later through operating the operation switch 17. Further, the driver can control whether or not to perform a lane keeping assist control described later using the operation switch 17.

A yaw rate sensor 18 detects a yaw rate YRt of the own vehicle and outputs a detection signal or output signal indicative of the yaw rate YRt to the driving support ECU 10.

The engine ECU 20 is electrically connected to engine actuators 21 of the engine 22. The engine actuators 21 include at least a throttle valve actuator (not shown) for changing an opening degree of the throttle valve of the engine 22. The engine ECU 20 can change an engine torque generated by the engine 22 by controlling activations of the engine actuators 21. The engine torque generated by the engine 22 is transmitted to drive wheels (not shown) through a transmission (not shown). Therefore, the engine ECU 20 can control a driving force supplied to the own vehicle (that is, to the drive wheels) by controlling the activations of the engine actuators 21 to thereby change an acceleration or an acceleration state. In the case where the own vehicle is a hybrid vehicle, the engine ECU 20 can control the driving force generated by one or both of "the engine and an electric motor" as the vehicle driving source. In the case where the own vehicle is an electric vehicle (battery vehicle), the engine ECU 20 can control the driving force generated by the electric motor as the vehicle driving source.

The brake ECU 30 is electrically connected to a brake actuator 31. The brake actuator 31 is provided in a hydraulic circuit provided between a master cylinder (not shown) for pressurizing hydraulic oil by a depression force of the brake pedal 12*a* and a friction brake mechanism 32 provided in right and left front and rear wheels of the own vehicle. The brake actuator 31 adjusts a hydraulic pressure supplied to a wheel cylinder (not shown) in each brake caliper 32*b* of the friction brake mechanism 32, depending on a command sent from the brake ECU 30. The wheel cylinder is activated by the hydraulic pressure to press a brake pad (not shown) on the brake disc 32*a*, thereby to generate a friction braking force on the brake disc 32*a*. Therefore, the brake ECU 30 can control an activation of the brake actuator 31 to control the braking force applied to the own vehicle (that is, to the wheels) to thereby change an acceleration or an acceleration state (or deceleration, that is, negative acceleration).

The steering ECU 40 is a control device of a known electric powered steering system and is electrically connected to a motor driver 41. The motor driver 41 is electrically connected to a steering motor 42. The steering motor 42 is assembled in a steering mechanism (not shown) including the steering wheel SW, the steering shaft US connected to the steering wheel SW, a steering gear mechanism (not shown) and the like. The steering motor 42 generates a torque by an electric power supplied from the motor driver 41 and uses the torque to apply a steering assist torque to the steering shaft US to thereby steer the right and left steered wheels. That is, the steering motor 42 can change a steering angle of the own vehicle.

<Control as Prerequisite of Embodiment Apparatus>

Next, an outline of controls performed by the embodiment apparatus will be described. The driving support ECU 10 is capable of performing the "following-travel inter-vehicle-distance control such as the adaptive cruise control (ACC)" and the "lane keeping assist control".

<Adaptive Cruise Control (ACC)>

When a preceding vehicle (referred to as an "ACC-target vehicle") which is traveling at a front area of the own vehicle and immediately ahead of the own vehicle is present, the following-travel inter-vehicle-distance control has the own vehicle follow the preceding vehicle while maintaining an inter-vehicle distance between the preceding vehicle and the own vehicle at a predetermined distance, based on the target object information. Hereinafter, the following-travel inter-vehicle-distance control will be referred to as "Adaptive Cruise Control (ACC)". The ACC itself is widely known (e.g., refer to Japanese Patent Application Laid-open No. 2014-148293, Japanese Patent Application Laid-open No. 2006-315491, Japanese Patent No. 4172434, and Japanese Patent No. 4929777). Thus, a brief description on the ACC is now given.

The driving support ECU 10 is configured to perform the ACC when the ACC is requested through the operation applied to the operation switch 17.

Specifically, the driving support ECU 10 selects the ACC-target vehicle, which the own vehicle should follow, based on the target object information acquired by the ambient sensor 16 when the ACC is requested. For example, the driving support ECU 10 determines whether or not a relative position of the target object (n) is present within a following-target vehicle area. The relative position of the target object (n) is determined based on the lateral distance Dfy(n) and the inter-vehicle distance Dfx(n) of the detected target object (n). The driving support ECU 10 estimates a traveling direction of the own vehicle based on the traveling speed SPD of the own vehicle and the yaw rate YRt of the own vehicle. The following-target vehicle area is an area previously determined such that, the longer the distance in the traveling direction of the own vehicle becomes, the smaller the absolute value of the distance in the lateral direction with respect to the traveling direction becomes. Then, when the relative position of the target object (n) is present within the following-target vehicle area for a time equal to or longer than a predetermined time, the driving support ECU 10 selects the target object (n) as the ACC-target vehicle. If a plurality of target objects (n) are present whose relative positions are present within the following-target vehicle area for the time equal to or longer than the predetermined time, the driving support ECU 10 selects as the ACC-target vehicle the target object having the minimum inter-vehicle distance Dfx(n) from among those target objects.

Further, the driving support ECU 10 calculates a target acceleration Gtgt in accordance with any of the following Expressions (1) and (2). In the Expressions (1) and (2), Vfx(a) is a relative vehicle speed of the ACC-target vehicle (a) with respect to the own vehicle, k1 and k2 are predetermined positive gains or coefficients, and ΔD1 is an inter-vehicle distance difference obtained by subtracting a target inter-vehicle distance Dtgt from the inter-vehicle distance Dfx(a) of the ACC-target vehicle (a) (ΔD1=Dfx(a)−Dtgt). The target inter-vehicle distance Dtgt is calculated by multiplying a target inter-vehicle time Ttgt by the vehicle speed SPD of the own vehicle 100 (Dtgt=Ttgt×SPD). The target inter-vehicle time Ttgt is set by the driver using the operation switch 17.

The driving support ECU 10 determines the target acceleration Gtgt in accordance with the following Expression (1) when the value (k1×ΔD1+k2×Vfx(a)) is positive or zero. In the Expression (1), ka1 is a positive gain or coefficient for accelerating the own vehicle and is set to a value equal to or smaller than "1".

$$Gtgt \text{ (for acceleration)} = ka1 \times (k1 \times \Delta D1 + k2 \times Vfx(a)) \quad (1)$$

On the other hand, when the value (k1×ΔD1+k2×Vfx(a)) is negative, the driving support ECU 10 determines the target acceleration Gtgt in accordance with the following Expression (2). In the Expression (2), kd1 is a gain or coefficient for decelerating the own vehicle and in this embodiment, is set to "1".

$$Gtgt \text{ (for deceleration)} = kd1 \times (k1 \times \Delta D1 + k2 \times Vfx(a)) \quad (2)$$

When no target object is present within the following-target vehicle area, the driving support ECU 10 determines the target acceleration Gtgt based on the vehicle speed SPD of the own vehicle and a target vehicle speed in such a manner that the vehicle speed SPD of the own vehicle matches up with (becomes equal to) the target vehicle speed which is set depending on the target inter-vehicle time Ttgt.

The driving support ECU 10 controls the engine actuators 21 by using the engine ECU 20 and if necessary, and controls the brake actuator 31 by using the brake ECU 30 in such a manner that the acceleration of the own vehicle matches up with (becomes equal to) the target acceleration Gtgt. As described above, the driving support ECU 10 has, as a functional unit implemented by the CPU, an "ACC control unit 10a for performing the following-travel inter-vehicle-distance control such as the ACC".

<Lane Keeping Assist Control>

The driving support ECU 10 is configured to perform the lane keeping assist control when the lane keeping assist control is requested through the operation applied to the operation switch 17 while the following-travel inter-vehicle-distance control (ACC) is being performed.

In the lane keeping assist control, the driving support ECU 10 determines/sets/produces a target traveling line (target traveling path) by using one or both of the travel trajectory of the preceding vehicle (i.e., preceding vehicle trajectory) and the white lines. The target traveling line is set within the lane in which the vehicle is currently traveling. The driving support ECU 10 applies the steering torque to the steering mechanism to change the steering angle of the own vehicle in such a manner that a lateral position of the own vehicle (i.e., a position in the vehicle-width direction of the own vehicle with respect to the lane) is maintained in an immediate vicinity of (at a position close to) the target traveling line. In this manner, the steering operation of the driver can be assisted/supported. The lane keeping assist control is widely known (e.g., refer to Japanese Patent Application Laid-open No. 2008-195402, Japanese Patent Application Laid-open No. 2009-190464, Japanese Patent Application Laid-open No. 2010-6279, and Japanese Patent No. 4349210). The lane keeping assist control is also referred to as "Lane Trace Control (LTC)" or "Traffic Jam Assist (TJA)". Hereinafter, the lane keeping assist control will be sometimes simply referred to as "LTC".

Next, an aspect of the LTC will be described which is performed by using the target traveling line determined based on the preceding vehicle trajectory. The LTC according to this aspect is also referred to as the "follow-up steering control". The preceding vehicle of which preceding vehicle trajectory is used to determine the target traveling line is also referred to as a "follow-up preceding vehicle for steering control". The driving support ECU 10 specifies/determines the preceding vehicle (that is, the follow-up preceding vehicle for steering control), which is the target object for obtaining/determining the preceding vehicle trajectory which is used to determine the target traveling line, in the same manner as when specifying the ACC-target vehicle.

Figure 2:
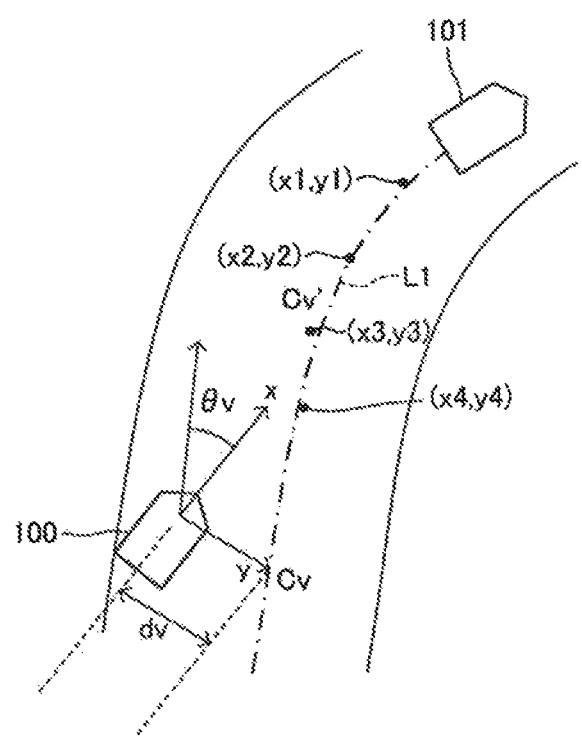
FIG. 2 is a plan view for illustrating a situation in which a first aspect of a lane keeping assist control (LTC) is performed by using a target traveling line determined based on a preceding vehicle trajectory.

As illustrated in FIG. 2, the driving support ECU 10 specifies/determines the preceding vehicle 101 which is the target object for obtaining/determining the preceding vehicle trajectory L1. The driving support ECU 10 obtains/determines the preceding vehicle trajectory L1 based on the target object information. The target object information includes information on positions of the preceding vehicle 101 with respect to the position of the own vehicle 100 at predetermined time intervals. In the x-y coordinate shown in FIG. 2, the center axis extending in the front-rear direction of the own vehicle 100 is defined as the x-axis, the axis perpendicular to the x-axis is defined as the y-axis, and the current position of the own vehicle 100 is defined as the origin (x=0, y=0), respectively.

The symbols shown in FIG. 2 are as follows.

dv: a distance in the y-axis direction (substantially in the road-width direction) between the current position (x=0, y=0) of the center position in the vehicle-width direction of the own vehicle 100, and the preceding vehicle trajectory L1. The distance dv is also referred to as a "deviation distance" for convenience.

θv: an angle of deviation (yaw angle) between the direction (tangential direction) of the preceding vehicle trajectory L1 at a position corresponding to the current position (x=0, y=0) of the own vehicle 100, and the traveling direction ("+" direction of the x-axis) of the own vehicle 100.

Cv: a curvature of the preceding vehicle trajectory L1 at a position (x=0, y=dv) corresponding to the current position (x=0, y=0) of the own vehicle 100.

Cv': a change ratio of the curvature, that is, a curvature change amount per unit distance (Δx) at an any position (x=x0, x0 is an arbitrary value) of the preceding vehicle trajectory L1.

For example, the driving support ECU 10 stores (buffers) position coordinate data (position information) on the position of the preceding vehicle 101 in the RAM every time the certain sampling period of time elapses. In order to minimize data to be stored in the RAM, the driving support ECU 10 may store only a limited number of "relatively new position coordinate data sets of the preceding vehicle 101" which have been obtained within a certain period up to the current time point and which includes the latest position coordinate data set, and discard the position coordinate data sets older than the data sets obtained in that certain period. The driving support ECU 10 converts the position coordinate data of the preceding vehicle 101 stored in the RAM into the position coordinate data of the above-described x-y coordinate system where the current position of the own vehicle 100 is the origin (x=0, y=0). The driving support ECU 10 executes the above-mentioned converting process based on the differences between (i) the position and traveling direction of the own vehicle 100 at each time point at which the position coordinate data is acquired, and (ii) the position and traveling direction of the own vehicle 100 at the current time point. In FIG. 2, (x1, y1), (x2, y2), (x3, y3) and (x4, y4) are examples of the position coordinate data of the preceding vehicle 101 which are obtained by converting in the above-mentioned manner. Hereinafter, such position coordinate data are also referred to as "converted position coordinate data".

The driving support ECU 10 executes a curve fitting process by using the converted position coordinate data of the preceding vehicle 101 to obtain the preceding vehicle trajectory L1 of the preceding vehicle 101. For example, a cubic function f(x) is used in the fitting curve process. In the fitting process, for example, the least squares method is used. As described above, the driving support ECU 10 has, as a functional unit implemented by the CPU, a "travel trajectory obtaining unit 10b for obtaining/extrapolating/determining the preceding vehicle trajectory L1 which is the travel trajectory of the preceding vehicle".

Figures 3A, 3B, 3C:
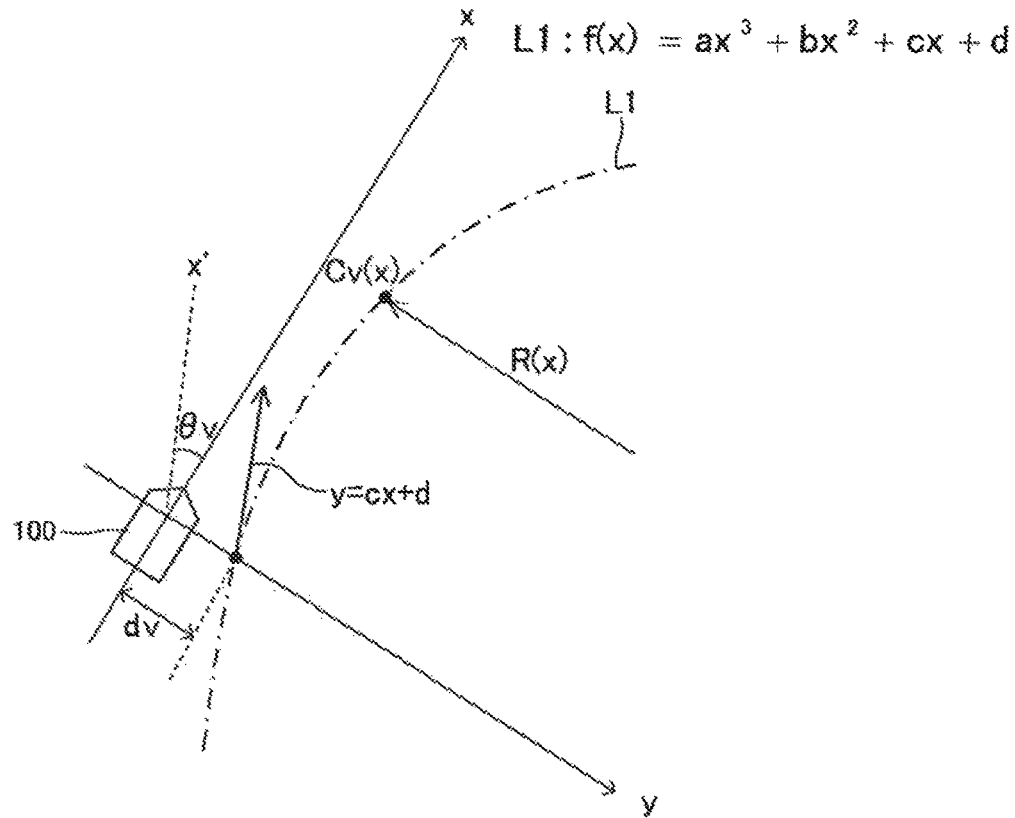

As illustrated in FIG. 3A, the preceding vehicle trajectory L1 is defined by the following cubic function: $f(x)=ax^3+bx^2+cx+d$. Using expressions and conditions shown in FIG. 3B, the relationship shown in FIG. 3C, that is, the relationship between the coefficients (a, b, c and d) of the cubic function f(x), the curvature Cv, the yaw angle θv and the like is derived. Therefore, the preceding vehicle trajectory L1 can be expressed by the following Expression (3). As described above, the driving support ECU 10 can determine/define the preceding vehicle trajectory L1 by obtaining the coefficients a, b, c and d of the cubic function f(x) by using the least squares method. Therefore, the change ratio of the curvature Cv' of the preceding vehicle trajectory L1, the curvature Cv of the preceding vehicle trajectory L1 at the position corresponding to the current position of the own vehicle 100, the yaw angle θv at that position, and the distance dv at that position can be obtained.

$$f(x)=(1/6)Cv'\times x^3+(1/2)Cv\times x^2+\theta v\times x+dv \quad (3)$$

When setting the preceding vehicle trajectory L1 as the target traveling line, the driving support ECU 10 acquires target lane information necessary for performing the follow-up steering control (one aspect of the LTC), based on the coefficients a, b, c and d of the cubic function f(x), and the relationship shown in FIG. 3C. The target lane information includes the curvature Cv (and the change ratio of the curvature Cv') of the target traveling line, the yaw angle θv of the own vehicle with respect to the target traveling line, and the distance dv in the road-width direction with respect to the target traveling line.

The driving support ECU 10 calculates, every time a predetermined period of time elapses, a target steering angle θ* by applying the curvature Cv, the yaw angle θv and the distance dv to the following Expression (4). Further, the driving support ECU 10 controls the steering motor 42 by using the steering ECU 40 in such a manner that an actual steering angle θ of the own vehicle matches up with (becomes equal to) the target steering angle θ*.

In the Expression (4), Klta1, Klta2 and Klta3 are predetermined control gains or coefficients.

$$\theta^*=Klta1\times Cv+Klta2\times\theta v+Klta3\times dv \quad (4)$$

In addition, the above-mentioned target steering angle θ* is also referred to as "target steering information" for convenience. The above is the outline of the follow-up steering control which is one aspect of the LTC performed by using the target traveling line determined based on the preceding vehicle trajectory L1.

Figure 4:
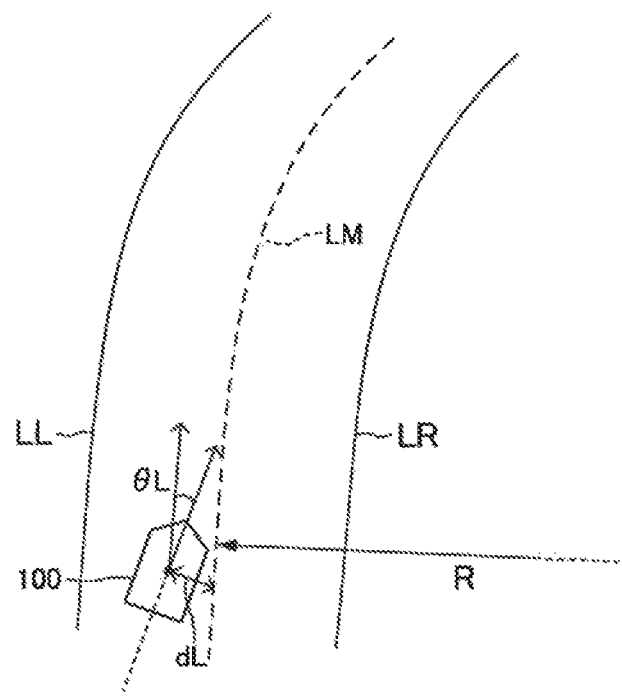
FIG. 4 is a plan view for illustrating a situation in which a second aspect of the lane keeping assist control (LTC) is performed by using a target traveling line determined based on a center line of a travel lane.

Next, an aspect of the LTC will be described which is performed by using the target traveling line determined based on the white lines. As illustrated in FIG. 4, the driving support ECU 10 acquires information on a left white line LL and a right white line LR of a travel lane in which the own vehicle 100 is currently traveling, based on the information transmitted from the ambient sensor 16 (i.e., the information which has been recognized by the camera sensor 16b). The driving support ECU 10 extrapolates a line connecting center positions in the road-width direction between the recognized pair of the white lines LL and LR, and determines/defines the extrapolated line as a center line LM of the travel lane. As described above, the driving support ECU 10 has, as a functional unit implemented by the CPU, a "lane line recognition unit 10c for extrapolating/determining the center line LM which is the line connecting the center positions between the recognized pair of the white lines LL and LR".

Further, the driving support ECU 10 calculates (i) a curve radius R and a curvature CL (=1/R) of the center line LM of the travel lane, and (ii) the position and the direction of the own vehicle 100 in the travel lane which is defined by the left white line LL and the right white line LR. Specifically, as illustrated in FIG. 4, the driving support ECU 10 calculates (i) a distance dL in the y-axis direction (substantially in the road-width direction) between the central position in the vehicle-width direction of the own vehicle 100 and the center line LM of the travel lane, and (ii) an angle of deviation θL (yaw angle θL) formed between the direction (tangential direction) of the center line LM and the traveling direction of the own vehicle 100. These parameters are the target lane information necessary for performing the LTC in the case where the center line LM of the travel lane is set as the target traveling line. The target lane information includes the curvature CL of the target traveling line, the yaw angle θL of the own vehicle with respect to the target traveling line, and the distance dL in the road-width direction with respect to the target traveling line.

In the Expression (4), the driving support ECU 10 replaces dv, θv, and Cv with dL, θL, and CL, respectively to thereby calculate the target steering angle θ*. The driving support ECU 10 controls the steering motor 42 by using the steering ECU 40 in such a manner that an actual steering angle θ of the own vehicle matches up with (becomes equal to) the target steering angle θ*. Alternatively, the driving support ECU 10 may control the steering motor 42 by using the Expression (4').

The above is the outline of one aspect of the LTC performed by using the target traveling line determined based on the white lines.

Figure 5:
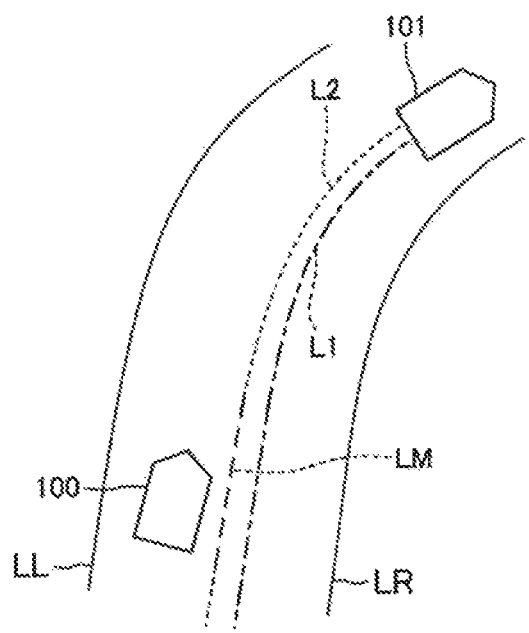
FIG. 5 is a diagram for illustrating a process for correcting/modifying the preceding vehicle trajectory based on the center line of the travel lane.

Further, the driving support ECU 10 can determine/extrapolate/obtain the target traveling line based on the combination of the preceding vehicle trajectory L1 and the center line LM of the travel lane. Specifically, as illustrated in FIG. 5, the driving support ECU 10 corrects/modifies the preceding vehicle trajectory L1 in such a manner that the preceding vehicle trajectory L1 becomes a trajectory which has the shape (curvature) of the preceding vehicle trajectory L1, and which matches up with the position and the direction (tangential direction) of the center line LM in the vicinity of the own vehicle 100. This allows the driving support ECU 10 to obtain, as the target traveling line, the preceding vehicle trajectory L2 which has the same shape (curvature) as the preceding vehicle trajectory L1 and has a small offset/deviation in the road-width direction with respect to the center line LM. Hereinafter, the preceding vehicle trajectory L2 which is obtained by correcting the preceding vehicle trajectory L1 in the above manner will be referred to as a "corrected preceding vehicle trajectory L2". The driving support ECU 10 acquires the target lane information when setting the corrected preceding vehicle trajectory L2 as the target traveling line. The driving support ECU 10 calculates the target steering angle θ* based on the target lane information and the above Expression (4). The driving support ECU 10 controls the steering motor 42 in such a manner that an actual steering angle θ of the own vehicle matches up with (becomes equal to) the target steering angle θ*.

In accordance with the following situations (a) to (d), the driving support ECU 10 of the embodiment apparatus sets the target traveling line in response to the presence/absence of the preceding vehicle and the recognition state of the white lines, to perform the LTC.

(a) When the driving support ECU 10 has successfully recognized the left and right white lines up to a far-away position (from the current position of the own vehicle to a position a first predetermined distance away), the driving support ECU 10 sets the target traveling line based on the center line LM of the travel lane to thereby perform the LTC.

(b) When the follow-up preceding vehicle for steering control is present ahead of the own vehicle and the driving support ECU cannot recognize any of the left and right white lines, the driving support ECU 10 sets the target traveling line based on the preceding vehicle trajectory L1 of the follow-up preceding vehicle for steering control to thereby perform the follow-up steering control which is one aspect of the LTC.

(c) When the follow-up preceding vehicle for steering control is present ahead of the own vehicle and the driving support ECU has recognized the left and right white lines in the vicinity of the own vehicle (from the current position of the own vehicle to a position a second predetermined distance away, the second predetermined distance being shorter than the first predetermined distance), the driving support ECU 10 sets the target traveling line based on the corrected preceding vehicle trajectory L2 obtained by correcting the preceding vehicle trajectory L1 of the follow-up preceding vehicle for steering control with the center line LM of the recognized white lines to thereby perform the follow-up steering control which is one aspect of the LTC.

(d) When no follow-up preceding vehicle for steering control is present ahead of the own vehicle and the driving support ECU cannot recognize the left and right white lines up to a far-away position, the driving support ECU 10 cancels the LTC.

As described above, the driving support ECU 10 has, as a functional unit implemented by the CPU, a "LTC control unit (lane keeping assist control unit) 10*d* for performing the lane keeping assist control for changing the steering angle of the own vehicle in such a manner that the own vehicle travels along the target traveling line".

<Outline of Operation>

Figure 6:
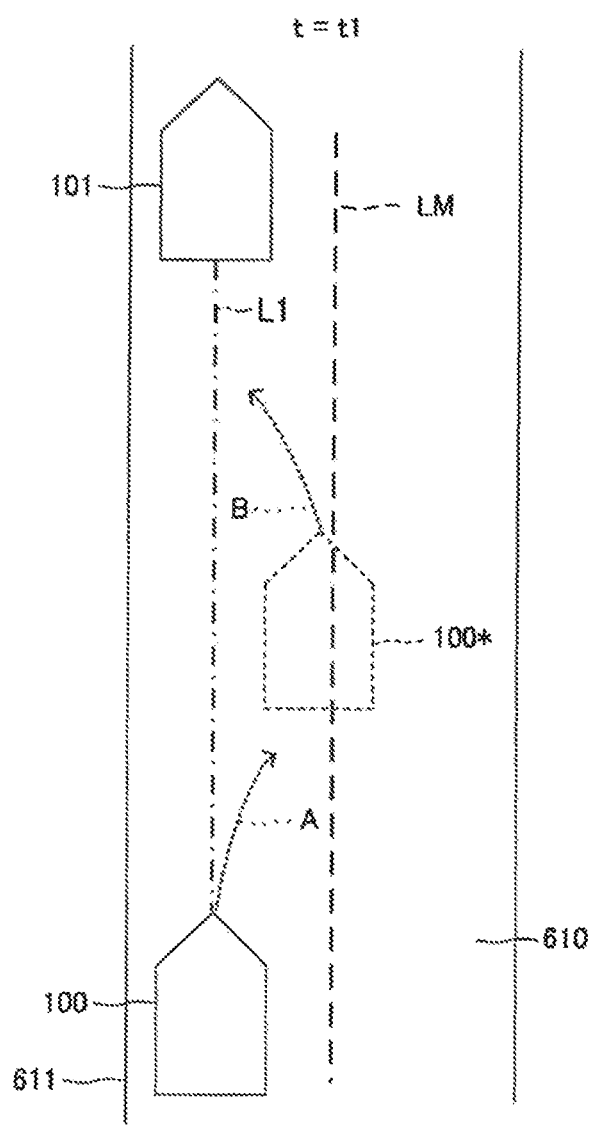
FIG. 6 is a plan view for illustrating a situation in which an own vehicle and a preceding vehicle travel in a vicinity of a left edge of a travel lane.

In the above-mentioned situation (b), the driving support ECU 10 sets the target traveling line based on the preceding vehicle trajectory L1 of the follow-up preceding vehicle for steering control to perform the steering control (i.e., the follow-up steering control) in such a manner that the own vehicle travels along the target traveling line. However, while the follow-up steering control is being performed, as illustrated in FIG. 6, if the preceding vehicle 101 travels at a position (near the left edge 611 of the travel lane 610) away from the center line LM of the road (travel lane), the own vehicle 100 also travels near the left edge 611 of the travel lane 610 owing to the follow-up steering control.

In the above-mentioned a situation, it is assumed that the driver wishes to modify the position of the own vehicle 100 to a position (100*) near the center line LM of the travel lane 610, and manually performs a steering operation (that is, manually operates the steering wheel SW). Owing to this steering operation, as illustrated by the arrow A in FIG. 6, the position of the own vehicle 100 moves toward the center line LM in the road-width direction. However, as the driver stops the manual steering operation, the above-mentioned related-art apparatus performs the follow-up steering control based on the preceding vehicle trajectory so as to return the own vehicle 100 to a position near the left edge 611 of the travel lane 610 as illustrated by the arrow B. That is, while the follow-up steering control is being performed, even if the driver intentionally performs the steering operation to modify the position of the own vehicle 100, there is a problem that the modified position of the own vehicle 100 cannot be maintained.

In order to solve the problem, in the above-mentioned situation (b), the driving support ECU 10 of the embodiment apparatus is configured to switch system states (in other words, control modes or control aspects) between a first state (first mode) and a second state (second mode) as described below. The first state is a state in which it is permitted (allowed) to perform the follow-up steering control based on the preceding vehicle trajectory L1. The second state is a state in which the follow-up steering control based on the preceding vehicle trajectory L1 is stopped (prohibited). When a specific condition (hereinafter, also referred to as a "predetermined control resumption condition") is satisfied in the second state, the follow-up steering control is resumed/restarted. The driving support ECU 10 switches the system states from the first state to the second state in response to the distance between the own vehicle 100 and the preceding vehicle trajectory L1, a detection result of the steering operation by the driver, and/or the like (that is, when a "control stop condition" described later is satisfied).

In addition, the above-mentioned second state means that only the performance of the follow-up steering control based on the preceding vehicle trajectory L1 is stopped (prohibited). In other words, in the second state, the performance of the LTC in the above-mentioned situation (a) is not prevented. That is, when the driving support ECU 10 has been recognizing the left and right white lines up to a relatively far distance from the current position of the own vehicle, the driving support ECU 10 performs the LTC based on the center line LM which is extrapolated based on the recognized left and right white lines.

<Content of Processing>

Next, with reference to FIGS. 6 to 9, the "follow-up steering control which is performed by the driving support ECU 10 when the driver performs the steering operation" will be described. In the examples illustrated in FIGS. 6 to 9, the driving support ECU 10 is performing the ACC.

In the example shown in FIG. 6, the preceding vehicle (i.e., follow-up preceding vehicle for steering control) 101 travels near the left edge 611 in the travel lane 610. At time t=t1 which is a calculation timing, it is assumed that the camera sensor 16*b* cannot recognize the left white line and the right white line. Under this assumption, at time t1, the driving support ECU 10 sets the target traveling line based on the preceding vehicle trajectory L1 of the preceding vehicle 101 to perform the follow-up steering control (that is, the current system state is the first state). Owing to the follow-up steering control, the own vehicle 100 travels near the left edge 611 in the travel lane 610 so as to follow the preceding vehicle trajectory L1. In such a situation, it is further assumed that the driver manually operates the steering wheel SW (that is, manually performs a steering operation) in such a manner that the position of the own vehicle 100 is modified/moved to the position (100*) near the center line LM of the travel lane 610.

Figure 7:
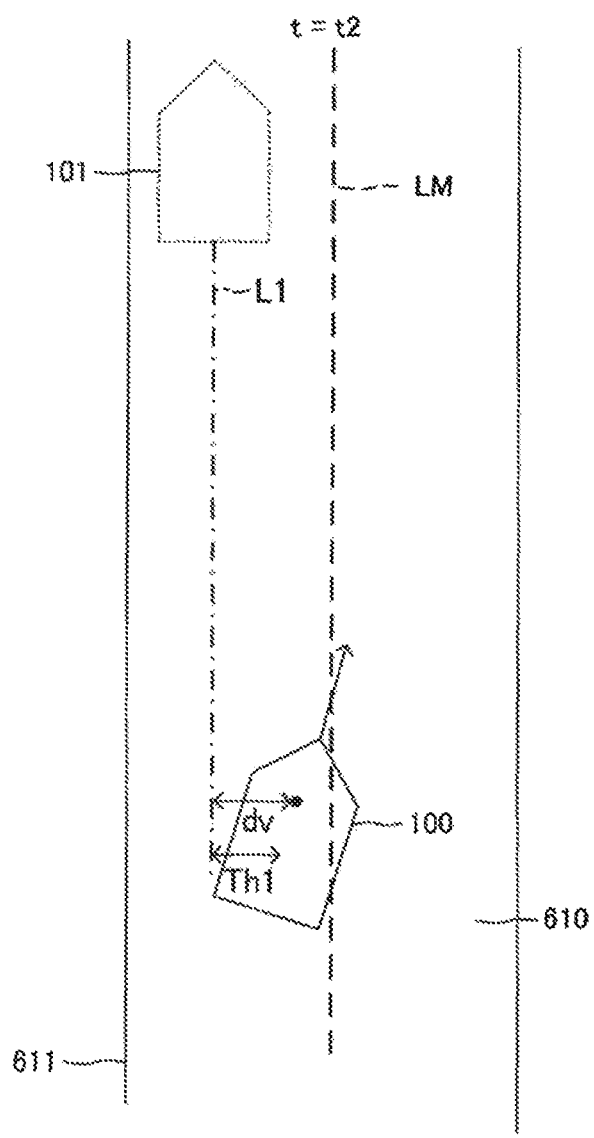
FIG. 7 is a plan view for illustrating a situation in which the own vehicle is brought close to a center line of the travel lane by a steering operation of a driver of the own vehicle after the situation of FIG. 6.

A time after a predetermined time period (time period longer than the above-mentioned sampling period of time) elapses from time t1 is denoted by t=t2. As illustrated in FIG. 7, at time t2, the own vehicle 100 travels toward the center line LM of the travel lane 610 owing to the steering operation of the driver.

On the other hand, every time the predetermined period of time elapses (every time the calculation timing arrives), the driving support ECU 10 calculates the distance dv in the road-width direction between the central position in the vehicle-width direction of the own vehicle 100 and the preceding vehicle trajectory L1. Further, every time the predetermined period of time elapses, the driving support ECU 10 determines whether or not the distance dv is equal to or longer than a predetermined first threshold Th1. When the distance dv is equal to or longer than the first threshold Th1, a first distance condition is satisfied.

As illustrated in FIG. 7, when the distance dv is equal to or longer than the first threshold Th1 (that is, the first distance condition is satisfied), the driving support ECU 10 determines whether or not a predetermined manual steering condition is satisfied. The manual steering condition is satisfied when the driver operates the steering wheel SW. When both of the first distance condition and the manual steering condition are satisfied, the above-mentioned control stop condition is satisfied.

For example, the manual steering condition is satisfied when the following Expression (5) is satisfied. "θ" is an actual steering angle detected by the steering angle sensor 13 at time t. "θ*" is the target steering angle calculated based on the preceding vehicle trajectory L1 obtained at time t. "Thθ" is a predetermined steering angle threshold (hereinafter, also referred to as a "third threshold" for convenience).

$$|\theta - \theta^*| \geq Th\theta \tag{5}$$

As illustrated in FIG. 7, at time t2, in the situation in which the preceding vehicle 101 travels near the left edge 611 of the travel lane 610, the driver manually has operated the steering wheel SW in such a manner that the own vehicle 100 moves from left to right in the road-width direction. The difference (|θ−θ*|) between the steering angle θ detected at the current time point (time t2) and the target steering angle θ* calculated at the current time point is larger than the predetermined steering angle threshold Thθ. Therefore, the manual steering condition is satisfied. When the distance dv is equal to or larger/longer than the first threshold Th1 and the manual steering condition is satisfied (that is, the control stop condition is satisfied), the driving support ECU 10 determines that the driver intentionally performs the manual steering operation to modify/change the position of the own vehicle 100. When it is determined that the driver intentionally has modified/changed the position of the own vehicle 100, the driving support ECU 10 stops (halts/pause) the follow-up steering control based on the preceding vehicle trajectory L1. Then, the driving support ECU 10 changes the system states from the first state to the second state. The second state is maintained until the predetermined control resumption condition described later is satisfied as long as a predetermined execution condition for the follow-up steering control is satisfied.

According to the embodiment apparatus including the above-mentioned configuration, when the driver manually performs the steering operation to modify/change the position of the own vehicle 100, the follow-up steering control based on the preceding vehicle trajectory L1 is not performed. Therefore, the position of the own vehicle 100 is not returned to the position near the left edge 611 of the travel lane 610. Accordingly, the position of the own vehicle 100 modified/changed by the driver can be maintained.

On the other hand, when the distance dv is shorter than the first threshold Th1, the driving support ECU 10 performs the follow-up steering control based on the preceding vehicle trajectory L1 (that is, the first state is maintained).

Further, even if the distance dv is equal to or longer than the first threshold Th1, when the manual steering condition is not satisfied, the driving support ECU 10 performs the follow-up steering control based on the preceding vehicle trajectory L1 (that is, the first state is maintained).

In addition, even when the driver manually performs the steering operation, the manual steering condition is designed to be unsatisfied under the following (X) or (Y) state:

(X): A state where the driver manually performs an additional steering operation so as to bring the own vehicle 100 close to the preceding vehicle trajectory L1, when the position of the own vehicle 100 is away from the preceding vehicle trajectory L1.

(Y): A state where the driver turns the steering wheel SW to the right (or left) as an additional steering operation in accordance with the travel lane which curves to the right (or left).

In the case of (X) or (Y), since the driver turns the steering wheel SW in the same direction as the direction represented by the target steering angle θ, the above difference (|θ−θ*|) is smaller than the steering angle threshold Thθ. Therefore, the manual steering condition is not satisfied. When the driver performs an additional steering operation to bring the position of the own vehicle 100 close to the preceding vehicle trajectory L1 or the driver performs an additional steering operation to have the own vehicle 100 travel safely in the curved lane, the driving support ECU 10 continues performing the follow-up steering control based on the preceding vehicle trajectory L1. That is, the first state is maintained.

Figure 8:
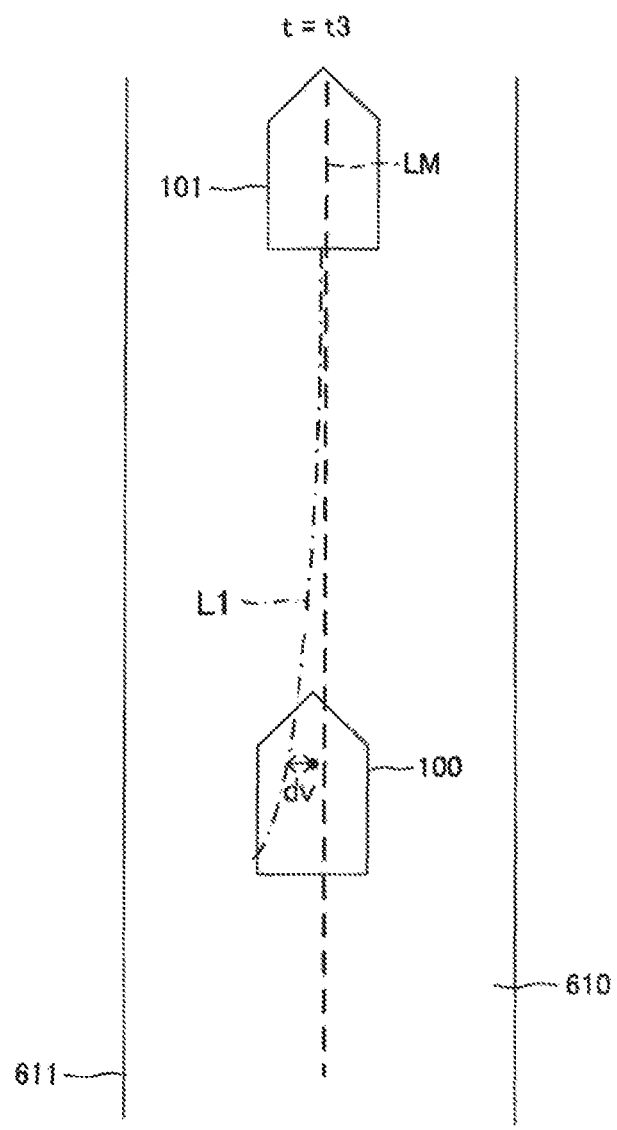
FIG. 8 is a plan view for illustrating a situation in which the preceding vehicle travels in the vicinity of the center line of the travel lane after the situation of FIG. 7.

Next, with reference to FIGS. 8 and 9, an operation after the system state is changed to the second state (that is, after the follow-up steering control is stopped) will be described. As already described with reference to FIG. 7, since the first distance condition and the manual steering condition are both satisfied at time t2, the system state becomes the second state. After time t2, every time the predetermined period of time elapses, the driving support ECU 10 repeatedly obtains the preceding vehicle trajectory L1 based on newly-obtained position coordinate data of the preceding vehicle 101, and determines whether or not the predetermined control resumption condition is satisfied. The control resumption condition is satisfied when the distance dv is equal to or shorter than a predetermined second threshold Th2. This control resumption condition may be referred to as a "second distance condition". The second threshold Th2 is set to a value shorter than the first threshold Th1. While the control resumption condition is not satisfied (that is, the distance dv is longer than the second threshold Th2), even in the situation in which the follow-up preceding vehicle for steering control is present ahead of the own vehicle 100, the driving support ECU 10 maintains the second state and does not perform the follow-up steering control based on the preceding vehicle trajectory L1. Note, however, that the driving support ECU 10 repeatedly selects the follow-up preceding vehicle for steering control, and continues obtaining the preceding vehicle trajectory L1 of the selected follow-up preceding vehicle for steering control.

A time after a certain time period elapses from time t2 is denoted by time t=t3. As illustrated in FIG. 8, at time t3, the preceding vehicle 101 is away from the left edge 611 of the travel lane 610 and is traveling in the vicinity of the center line LM of the travel lane 610. For this reason, at time t3, the distance dv becomes equal to or shorter than the predetermined second threshold Th2. Therefore, the control resumption condition is satisfied. The driving support ECU 10 changes the system states from the second state to the first state to resume the follow-up steering control based on the preceding vehicle trajectory L1.

As another example, as illustrated in FIG. 9, it is assumed that, at time t=t3' after a certain time period elapses from time t2, the driver manually performs the steering operation to bring the own vehicle 100 close to a position near the left edge 611 of the travel lane 610. In this case, since the driver intentionally brings the position of the own vehicle 100 close to the preceding vehicle trajectory L1 of the preceding vehicle 101, it is desirable to have the own vehicle 100 follow the preceding vehicle trajectory L1 of the preceding vehicle 101 in view of the intention of the driver. In this case as well, since the distance dv becomes equal to or shorter than the second threshold Th2, the control resumption condition is satisfied. Therefore, the driving support ECU 10 changes the system states from the second state to the first state to resume the follow-up steering control based on the preceding vehicle trajectory L1.

In the above-mentioned manner, when the control resumption condition becomes satisfied (that is, the distance dv becomes equal to or shorter than the predetermined second threshold Th2) after the system state has been changed to the second state, the driving support ECU 10 resumes the follow-up steering control based on the preceding vehicle trajectory L1. Therefore, the embodiment apparatus can have the own vehicle 100 follow the preceding vehicle trajectory L1 of the preceding vehicle 101 even if the driver does not perform a specific operation (i.e., without requiring the driver to perform a specific operation).

In order to perform the above-mentioned control, the driving support ECU 10 manages a state flag F. When the state flag F is "0", this means that the current system state is the first state. When the state flag F is "1", this means that the current system state is the second state.

<Concrete Operation>

Next, a concrete operation of the CPU (hereinafter, simply referred to as the "CPU") of the driving support ECU 10 will be described. As one routine for performing the LTC, the CPU is configured or programmed to execute a routine shown by a flowchart in FIG. 10, every time the predetermined period of time elapses (that is, every time the predetermined calculation timing arrives). In addition, the CPU executes the routine of FIG. 10 while the ACC is being performed.

Therefore, in the case where the ACC is being performed, as the predetermined calculation timing arrives, the CPU starts from a process of Step 1000 in FIG. 10, and proceeds to Step 1005 to determine whether or not a predetermined execution condition is satisfied. The predetermined execution condition is also referred to as an "execution condition for the follow-up steering control".

The predetermined execution condition is satisfied when the following conditions 1 and 2 are both satisfied.

(condition 1): The execution of the LTC is being selected through the operation of the operation switch 17.

(condition 2): Up to the current calculation timing, the camera sensor 16b has not recognized the left white line and the right white line for setting the center line LM of the travel lane to sufficiently far distance. That is, the CPU is not performing the LTC based on the center line LM of the travel lane at the current time point.

When the predetermined execution condition is not satisfied, the CPU makes a "No" determination at Step 1005, and proceeds directly to Step 1095 to tentatively terminate the present routine. In this case, the follow-up steering control based on the preceding vehicle trajectory L1 is not performed.

On the other hand, when the predetermined execution condition is satisfied, the CPU makes a "Yes" determination at Step 1005, and proceeds to Step 1010 to determine whether or not a preceding vehicle is present in a front area of (ahead of) the own vehicle 100.

When no other vehicle is present in the front area of the own vehicle 100, the CPU makes a "No" determination at Step 1010, and proceeds directly to Step 1095 to tentatively terminate the present routine.

It is assumed that an other vehicle is newly detected in the front area of the own vehicle 100 at the current time point. In this case, the CPU makes a "Yes" determination at Step 1010, and proceeds to Step 1015.

At Step 1015, the CPU acquires the traveling speed SPD of the own vehicle 100 from the vehicle speed sensor 15, and the yaw rate of the own vehicle 100 from the yaw rate sensor 18. Further, the CPU extrapolates the traveling direction of the own vehicle 100 based on the acquired traveling speed SPD and yaw rate. The CPU selects, as the follow-up preceding vehicle for steering control, the nearest target object from the own vehicle 100 in its traveling direction, based on the target object information transmitted from the ambient sensor 16. Hereinafter, the follow-up preceding vehicle for steering control is simply referred to as the "preceding vehicle". Although not shown in FIG. 10, if the preceding vehicle cannot be selected, the CPU proceeds directly to Step 1095 from Step 1015 to tentatively terminate the present routine. In this case, the follow-up steering control based on the preceding vehicle trajectory L1 is not performed.

Next, the CPU proceeds to Step 1020 to determine whether or not a flag reset condition is satisfied. For example, the flag reset condition is satisfied when at least one of the following conditions 3 and 4 is satisfied.

(condition 3): Although the CPU did not select the preceding vehicle at the previous calculation timing, the CPU newly selects the preceding vehicle at the current calculation timing.

(condition 4): The preceding vehicle selected at the current calculation timing is different from a vehicle selected as the preceding vehicle selected at the previous calculation timing.

If the preceding vehicle is newly selected at the current calculation timing, the above-mentioned condition 3 is satisfied, and thus, the flag reset condition is also satisfied. Therefore, the CPU makes a "Yes" determination at Step 1020, and proceeds to Step 1025. The CPU sets the value of the state flag F to "0" at Step 1025, and proceeds to Step 1030.

As described above, the CPU stores the position coordinate data for each target object in the RAM in association with each target object, based on the target object information from the ambient sensor 16. At Step 1030, the CPU acquires the position coordinate data corresponding to the preceding vehicle selected at Step 1015 from among the pieces of the position coordinate data. The CPU calculates the converted position coordinate data based on the acquired position coordinate data. Further, the CPU executes the curve fitting process with respect to the converted position coordinate data to obtain the preceding vehicle trajectory L1 of the preceding vehicle.

Next, the CPU proceeds to Step 1035, and calculates the target steering angle θ* as the target steering information using the Expression (4) as described above.

Next, at Step 1040, the CPU determines whether or not the state flag F is "0". Since the state flag F is now "0", the CPU makes a "Yes" determination, and proceeds to Step 1045.

Next, at Step 1045, the CPU determines whether or not the distance dv is equal to or longer than the first threshold Th1. That is, the CPU determines whether or not the first distance condition is satisfied. It is assumed that the position of the own vehicle 100 is close to the preceding vehicle trajectory L1, and therefore, the distance dv is shorter than the first threshold Th1. In this case, the CPU makes a "No" determination at Step 1045, and proceeds to Step 1070. As described later, at Step 1070, the follow-up steering control based on the preceding vehicle trajectory L1 is performed.

On the other hand, it is assumed that the position of the own vehicle 100 is away from the preceding vehicle trajectory L1, and therefore, the distance dv is equal to or longer than the first threshold Th1. In this case, since the first distance condition is satisfied, the CPU makes a "Yes" determination at Step 1045, and proceeds to Step 1050. At Step 1050, the CPU acquires information on the steering angle θ at the current time point from the steering angle sensor 13, and determines whether or not the predetermined manual steering condition (i.e., Expression (5)) is satisfied based on the steering angle θ and the target steering angle θ* calculated at Step 1035. Here, it is assumed that the driver is not performing the steering operation. In this case, since the manual steering condition is not satisfied, the CPU makes a "No" determination at Step 1050, and proceeds to Step 1070.

When the CPU proceeds to Step 1070, the CPU performs the follow-up steering control based on the preceding vehicle trajectory L1. That is, the CPU performs the steering control in such a manner that the steering angle θ at the current time point matches up with (becomes equal to) the target steering angle θ*. Then, the CPU proceeds to Step 1095 to tentatively terminate the present routine.

Here, after the predetermined period of time elapses in the above situation, it is assumed that the driver has performed the steering operation manually so that the situation described with reference to FIG. 7 has occurred. In this case, as the predetermined calculation timing arrives, the CPU resumes the process from Step 1000. When the CPU proceeds to Step 1005, the above-mentioned predetermined execution condition (all of the conditions 1 and 2) is again satisfied. Therefore, the CPU proceeds from Step 1005 to Step 1010. Further, the preceding vehicle is present ahead of the own vehicle 100 in this situation. Therefore, the CPU proceeds from Step 1010 to Step 1015, and selects again that preceding vehicle. Thereafter, the CPU proceeds to Step 1020.

In this case, the preceding vehicle has been selected at the previous calculation timing, and the preceding vehicle selected at the current calculation timing is the same as a vehicle selected as the preceding vehicle selected at the previous calculation timing. Therefore, neither of the above-mentioned condition 3 nor condition 4 is satisfied. That is, the flag reset condition is not satisfied. Therefore, the CPU makes a "No" determination at Step 1020 and proceeds directly to Step 1030. As a result, the value of the state flag F is maintained at "0".

The CPU again obtains the preceding vehicle trajectory L1 of the preceding vehicle at Step 1030, and proceeds to Step 1035 to calculate the target steering angle θ*.

Next, at Step 1040, the CPU determines whether or not the state flag F is "0". Since the state flag F is now "0", the CPU makes a "Yes" determination, and proceeds to Step 1045.

Next, at Step 1045, the CPU determines whether or not the distance dv is equal to or longer than the first threshold Th1. Since the situation as described with reference to FIG. 7 occurs at present, the distance dv is equal to or longer than the first threshold Th1. That is, the first distance condition is satisfied. Therefore, the CPU makes a "Yes" determination at Step 1045, and proceeds to Step 1050 to determine whether or not the above-mentioned manual steering condition is satisfied.

Since the manual steering condition is now satisfied, the CPU makes a "Yes" determination at Step 1050, and proceeds to Step 1055 to set the value of the state flag F to "1". That is, the system state is changed from the first state to the second state. That is, the CPU does not perform the follow-up steering control based on the preceding vehicle trajectory L1, and proceeds to Step 1095 to tentatively terminate the present routine.

After the predetermined period of time elapses in this situation, the CPU resumes the process from Step 1000. When the CPU proceeds to Step 1005, the above-mentioned predetermined execution condition (all of the conditions 1 and 2) is again satisfied. Therefore, the CPU proceeds from Step 1005 to Step 1010. Further, the preceding vehicle is present ahead of the own vehicle 100 in this situation. Therefore, the CPU proceeds from Step 1010 to Step 1015, and selects again that preceding vehicle. Thereafter, the CPU proceeds to Step 1020.

In this situation, neither of the above-mentioned condition 3 nor condition 4 is satisfied. That is, the flag reset condition is not satisfied. Therefore, the CPU makes a "No" determination at Step 1020, and proceed directly to Step 1030. As a result, the state flag F is maintained at "1".

The CPU again obtains the preceding vehicle trajectory L1 of the preceding vehicle at Step 1030, and calculates the target steering angle θ* at Step 1035.

Next, at Step 1040, the CPU determines whether or not the state flag F is "0". Since the state flag F is now "1", the CPU makes a "No" determination and proceeds to Step 1060.

At Step 1060, the CPU determines whether or not the above-mentioned control resumption condition is satisfied. Here, it is assumed that the position of the preceding vehicle 101 has been changed during a time period from the previous calculation timing to the current calculation timing, and therefore, the situation as described with reference to FIG. 8 has occurred. In this case, since the distance dv is equal to or shorter than the second threshold Th2, the control resumption condition is satisfied. Therefore, the CPU makes a "Yes" determination at Step 1060, and proceeds to Step 1065 to set the value of the state flag F to "0". That is, the system state is changed from the second state to the first state. Thereafter, the CPU proceeds to Step 1070 to resume the follow-up steering control based on the preceding vehicle trajectory L1. Next, the CPU proceeds to Step 1095 to tentatively terminate the present routine.

It should be noted that, at the time point at which the CPU executes the process of Step 1060, in a case where the driver has manually performed the steering operation to bring the own vehicle 100 to a position close to the preceding vehicle trajectory L1 as described with reference to FIG. 9, the control resumption condition is also satisfied. In this case, the CPU proceeds to Step 1070 via Step 1065 to resume the follow-up steering control based on the preceding vehicle trajectory L1.

On the other hand, it is assumed that, when the CPU proceeds to Step 1060, the preceding vehicle 101 still travels near the left edge 611 of the travel lane 610. In this case, the CPU makes a "No" determination at Step 1060, and proceeds to Step 1095 to tentatively terminate the present routine. Therefore, the value of the state flag F is maintained at "1". That is, the CPU maintains the system state at the second state, and therefore, does not perform the follow-up steering control based on the preceding vehicle trajectory L1.

As described above, when the first distance condition is satisfied and the manual steering condition is satisfied while the follow-up steering control based on the preceding vehicle trajectory L1 is being performed, the embodiment apparatus does not perform (stops) the follow-up steering control based on the preceding vehicle trajectory L1, and changes the system states from the first state to the second state. Therefore, when the driver intentionally and manually performs the steering operation to modify the position of the own vehicle 100 as described above with reference to FIG. 7, the position of the own vehicle 100 is not returned to the "position before that modification", because the follow-up steering control based on the preceding vehicle trajectory L1 is not performed. Thus, the embodiment apparatus can maintain the position of the own vehicle 100 which is modified by the driver during performance of the follow-up steering control.

Further, after the system state once becomes the second state, the embodiment apparatus maintains the second state while (as long as) the distance dv is longer than the second threshold value Th2. Meanwhile, when the distance dv becomes equal to or shorter than the second threshold Th2 (that is, the control resumption condition becomes satisfied), the embodiment apparatus resumes the follow-up steering control based on the preceding vehicle trajectory L1. Therefore, even if the system state becomes the second state, when the preceding vehicle 101 is moved to a position in the vicinity of the center line LM of the travel lane 610 (refer to FIG. 8) or when the driver intentionally moves the own vehicle 100 to a position in the vicinity of the preceding vehicle trajectory L1 (refer to FIG. 9), and the like, the embodiment apparatus resumes the follow-up steering control based on the preceding vehicle trajectory L1. In this manner, the embodiment apparatus automatically resumes the follow-up steering control based on the preceding vehicle trajectory L1 in response to the positional relationship between the own vehicle 100 and the preceding vehicle 101, even if the driver does not perform a specific operation (that is, without requiring the driver to perform a specific/particular operation).

The present disclosure is not limited to the above-mentioned embodiment, and various changes can be adopted within the scope of the present disclosure.

For example, at Step 1030, the CPU may obtain/calculate/produce the preceding vehicle trajectory L1 by using the Kalman filter. More specifically, in some embodiments, the driving support ECU 10 includes the Kalman filter. The CPU inputs/applies, to the Kalman filter, the position information of the own vehicle and the position information of the follow-up preceding vehicle for steering control which has been stored in the RAM. In response to this input, the Kalman filter outputs (i) the curvature Cv of the preceding vehicle trajectory L1 at a position corresponding to the current position of the own vehicle 100, (ii) the change ratio of the curvature Cv' of the preceding vehicle trajectory L1, (iii) the yaw angle θv of the own vehicle 100 with respect to the preceding vehicle trajectory L1, and (iv) the distance dv between the current position of the own vehicle 100 and the preceding vehicle trajectory L1. The CPU can obtain the coefficients a, b, c, and d of the cubic function f(x) based on the relationship shown in FIG. 3C (that is, the relationship between/among the coefficients (a, b, c, and d) of the cubic function f(x), the curvature, the yaw angle and the like).

In some embodiments, when the CPU has recognized the white lines in the vicinity of the own vehicle 100 before the time point at which the CPU executes the process of Step 1030, the CPU obtains/calculates the corrected preceding vehicle trajectory L2 through correcting/modifying the preceding vehicle trajectory L1 with the recognized white lines.

In some embodiments, the CPU may use the steering torque Tra as the steering-related amount at Step 1050. In this configuration, the manual steering condition may be the following Expression (5'). "Tra" is a steering torque detected by the steering torque sensor 14 at time t. "Thr" is a predetermined torque threshold (also referred to as a "fourth threshold" for convenience).

$$|Tra| \geq Thr \tag{5'}$$

The embodiment apparatus is configured to perform the LTC only while the ACC is being performed. However, the embodiment apparatus may be configured to perform the LTC even while the ACC is not being performed.

What is claimed is:

1. A non-transitory computer-readable medium storing instructions, the instructions comprising: one or more instructions that, when executed by one or more processors, cause the one or more processors to:
    perform a follow-up steering control for changing a steering angle of a vehicle in such a manner that the vehicle travels along a target traveling line determined based on an obtained preceding vehicle trajectory, which is a travel trajectory of a preceding vehicle traveling ahead of the vehicle; and
    based on determining that a first distance condition and a manual steering condition are both satisfied while the follow-up steering control is being performed, stop the follow-up steering control, the first distance condition being a condition satisfied when a deviation distance in a road-width direction between the preceding vehicle trajectory and the vehicle is equal to or longer than a predetermined first threshold, and the manual steering condition being a condition satisfied when a driver operates a steering wheel of the vehicle to change a position in the road-width direction of the vehicle.

2. The non-transitory computer-readable medium according to claim 1, wherein the one or more instructions, when executed by the one or more processors, further cause the one or more processors to, based on a second distance condition being satisfied in a state in which the follow-up steering control is stopped owing to the satisfaction of both the first distance condition and the manual steering condition, resume the follow-up steering control, the second distance condition being a condition satisfied when the deviation distance is equal to or shorter than a predetermined second threshold.

3. The non-transitory computer-readable medium according to claim 2, wherein the one or more instructions, when executed by the one or more processors, further cause the one or more processors to determine whether or not the manual steering condition is satisfied based on a steering-related amount detected by a detector, the steering-related amount being an amount concerning an operation state of the steering wheel of the vehicle.

4. The non-transitory computer-readable medium according to claim 1, wherein the one or more instructions, when executed by the one or more processors, further cause the one or more processors to determine whether or not the manual steering condition is satisfied based on a steering-related amount detected by a detector, the steering-related amount being an amount concerning an operation state of the steering wheel of the vehicle.

5. The non-transitory computer-readable medium according to claim 1, wherein the one or more instructions, when executed by the one or more processors, further cause the one or more processors to, based on determining that the first distance condition is satisfied and the manual steering condition is not satisfied while the follow-up steering control is being performed, continue to perform the follow-up steering control.

\* \* \* \* \*